US012684243B2

(12) United States Patent
Uchida

(10) Patent No.: US 12,684,243 B2
(45) Date of Patent: Jul. 14, 2026

(54) BACK LIGHT CORRECTING DEVICE, METHOD OF OPERATING BACK LIGHT CORRECTING DEVICE, PROGRAM OF OPERATING BACK LIGHT CORRECTING DEVICE, AND IMAGING APPARATUS

(71) Applicant: FUJIFILM Corporation, Tokyo (JP)

(72) Inventor: Akihiro Uchida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 38 days.

(21) Appl. No.: 18/752,742

(22) Filed: Jun. 24, 2024

(65) Prior Publication Data

US 2025/0008224 A1 Jan. 2, 2025

(30) Foreign Application Priority Data

Jun. 29, 2023 (JP) ................................ 2023-107559

(51) Int. Cl.
*H04N 23/71* (2023.01)
*G06T 7/11* (2017.01)
(Continued)

(52) U.S. Cl.
CPC ............... *H04N 23/71* (2023.01); *G06T 7/11* (2017.01); *G06T 7/194* (2017.01); *H04N 23/73* (2023.01);
(Continued)

(58) Field of Classification Search
CPC ........ H04N 23/71; H04N 23/73; H04N 23/74; H04N 23/76; G06T 7/194; G06T 7/11;
(Continued)

(56) References Cited

U.S. PATENT DOCUMENTS 9,998,676 B2 * 6/2018 Yamamoto ................ G06T 5/94
2011/0001840 A1 * 1/2011 Ishii ....................... G02B 7/365
348/222.1
(Continued)

FOREIGN PATENT DOCUMENTS

JP 2000004393 A * 1/2000 ............ H04N 5/243
JP 2010177779 A * 8/2010
(Continued)

OTHER PUBLICATIONS

Translation of Japanese Document 2000004393. (Year: 2000).*

*Primary Examiner* — William R Korzuch
(74) *Attorney, Agent, or Firm* — JCIPRNET

(57) ABSTRACT

A first determination section performs first determination to determine that an imaged scene of an image is a backlit scene, in which light is emitted from behind a subject, in a case where a difference in luminance between a representative value of an exposure value of a reference region and a representative value of an exposure value of a peripheral region of the reference region is equal to or greater than a first threshold value which is set in advance. The first determination section sets the first threshold value to a value lower than a value, which is obtained in a case where it is determined that the saturated region is not present, in a case where it is determined by the first determination that the imaged scene is the backlit scene and it is determined by the second determination that the saturated region is present.

9 Claims, 16 Drawing Sheets

(51) Int. Cl.
*G06T 7/194* (2017.01)
*H04N 23/73* (2023.01)

(52) U.S. Cl.
CPC ............... *G06T 2207/30201* (2013.01); *G06T 2207/30232* (2013.01)

(58) Field of Classification Search
CPC ............. G06T 5/94; G06T 2207/30232; G06T 2207/30201
See application file for complete search history.

(56) References Cited

U.S. PATENT DOCUMENTS

| | | | | |
|---|---|---|---|---|
| 2011/0292243 | A1* | 12/2011 | Nagataki | H04N 23/741 348/E5.037 |
| 2015/0093040 | A1* | 4/2015 | Zhou | G06T 7/11 382/274 |
| 2018/0091719 | A1* | 3/2018 | Wakisaka | H04N 25/587 |
| 2020/0112662 | A1* | 4/2020 | Sakamoto | H04N 23/73 |
| 2022/0030160 | A1 | 1/2022 | Hashigami et al. | |

FOREIGN PATENT DOCUMENTS

| | | | | |
|---|---|---|---|---|
| JP | 6817590 | | | 1/2021 |
| JP | 2023047757 | A | * | 4/2023 |

* cited by examiner

FIG. 7

EXPOSURE VALUE INFORMATION

66

| DIVIDED REGION | REGION EXPOSURE VALUE |
|---|---|
| 0101 | 13 EV |
| 0102 | 13 EV |
| 0103 | 12 EV |
| ⋮ | |

| ENTIRETY EXPOSURE VALUE | 10 EV |
|---|---|

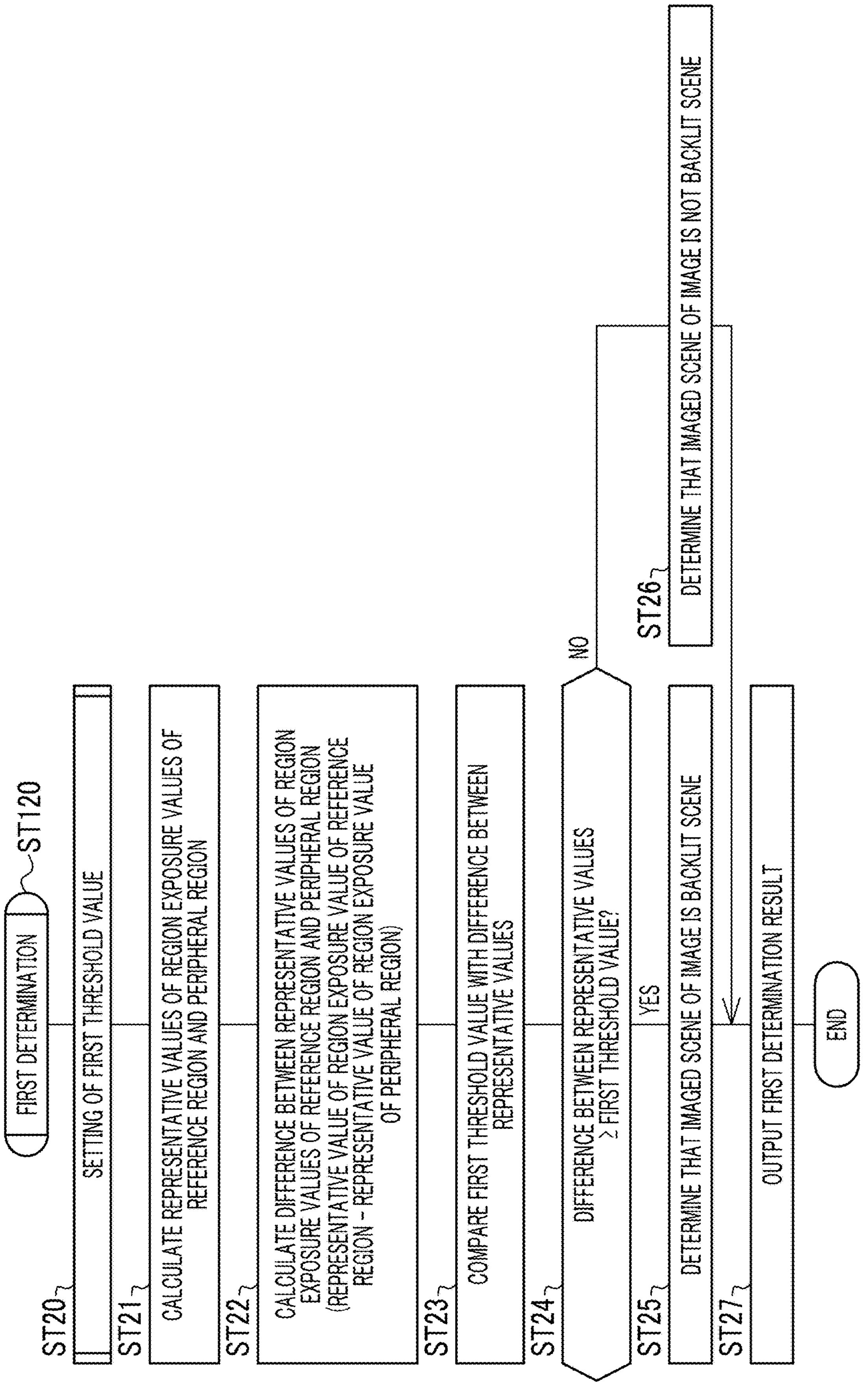

FIG. 8

FIRST DETERMINATION — ST120

ST20 — SETTING OF FIRST THRESHOLD VALUE

ST21 — CALCULATE REPRESENTATIVE VALUES OF REGION EXPOSURE VALUES OF REFERENCE REGION AND PERIPHERAL REGION

ST22 — CALCULATE DIFFERENCE BETWEEN REPRESENTATIVE VALUES OF REGION EXPOSURE VALUES OF REFERENCE REGION AND PERIPHERAL REGION (REPRESENTATIVE VALUE OF REGION EXPOSURE VALUE OF REFERENCE REGION − REPRESENTATIVE VALUE OF REGION EXPOSURE VALUE OF PERIPHERAL REGION)

ST23 — COMPARE FIRST THRESHOLD VALUE WITH DIFFERENCE BETWEEN REPRESENTATIVE VALUES

ST24 — DIFFERENCE BETWEEN REPRESENTATIVE VALUES ≥ FIRST THRESHOLD VALUE?

NO

YES

ST25 — DETERMINE THAT IMAGED SCENE OF IMAGE IS BACKLIT SCENE

ST26 — DETERMINE THAT IMAGED SCENE OF IMAGE IS NOT BACKLIT SCENE

ST27 — OUTPUT FIRST DETERMINATION RESULT

END

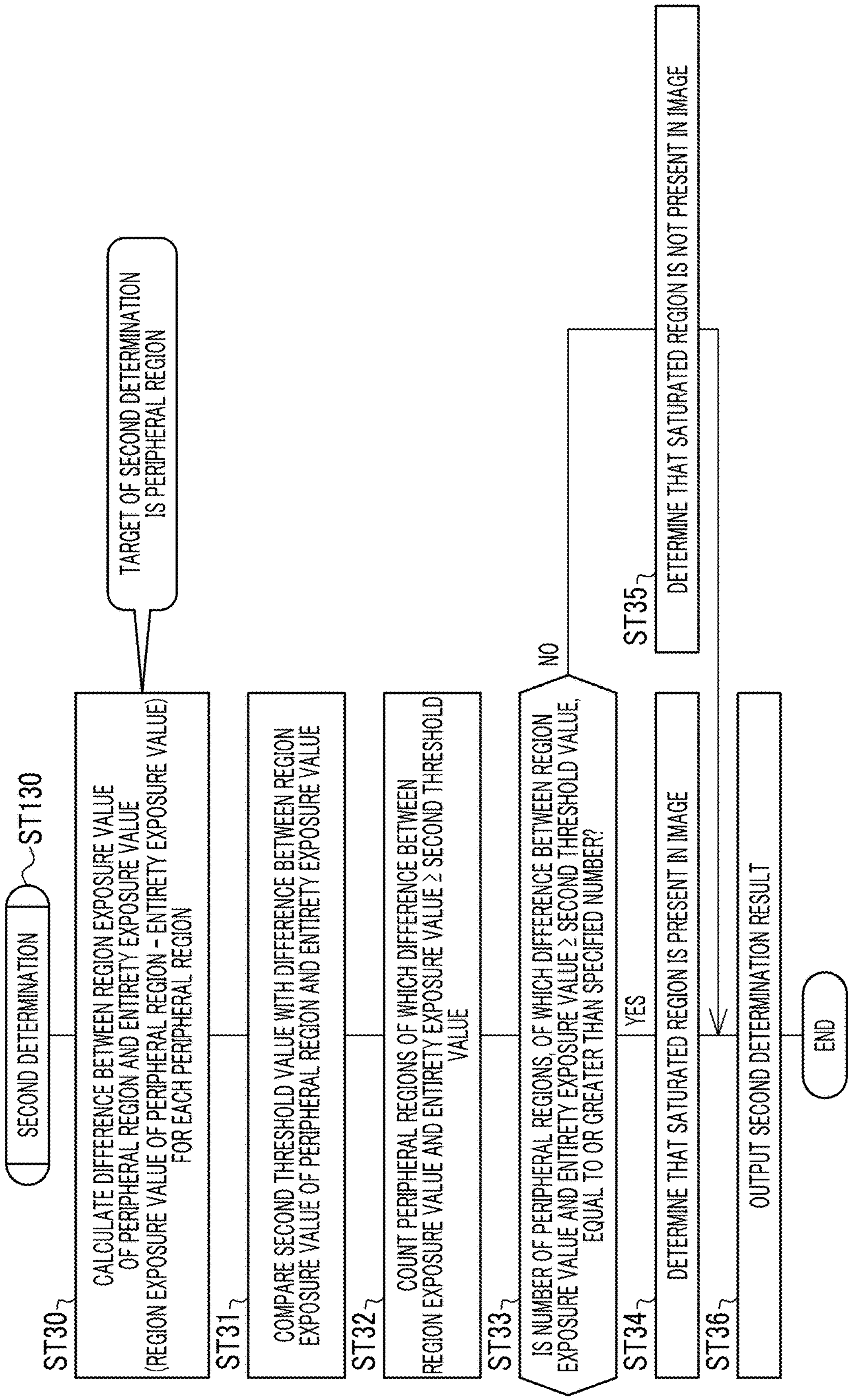

FIG. 11

SECOND DETERMINATION

ST130

ST30 — CALCULATE DIFFERENCE BETWEEN REGION EXPOSURE VALUE OF PERIPHERAL REGION AND ENTIRETY EXPOSURE VALUE (REGION EXPOSURE VALUE OF PERIPHERAL REGION – ENTIRETY EXPOSURE VALUE) FOR EACH PERIPHERAL REGION

TARGET OF SECOND DETERMINATION IS PERIPHERAL REGION

ST31 — COMPARE SECOND THRESHOLD VALUE WITH DIFFERENCE BETWEEN REGION EXPOSURE VALUE OF PERIPHERAL REGION AND ENTIRETY EXPOSURE VALUE

ST32 — COUNT PERIPHERAL REGIONS OF WHICH DIFFERENCE BETWEEN REGION EXPOSURE VALUE AND ENTIRETY EXPOSURE VALUE ≥ SECOND THRESHOLD VALUE

ST33 — IS NUMBER OF PERIPHERAL REGIONS, OF WHICH DIFFERENCE BETWEEN REGION EXPOSURE VALUE AND ENTIRETY EXPOSURE VALUE ≥ SECOND THRESHOLD VALUE, EQUAL TO OR GREATER THAN SPECIFIED NUMBER?

YES

NO

ST34 — DETERMINE THAT SATURATED REGION IS PRESENT IN IMAGE

ST35 — DETERMINE THAT SATURATED REGION IS NOT PRESENT IN IMAGE

ST36 — OUTPUT SECOND DETERMINATION RESULT

END

* EVX: REPRESENTATIVE VALUE OF REGION EXPOSURE VALUE OF REFERENCE REGION
EVY: REPRESENTATIVE VALUE OF REGION EXPOSURE VALUE OF PERIPHERAL REGION
ΔEV: DIFFERENCE BETWEEN REPRESENTATIVE VALUES OF REGION EXPOSURE VALUES OF REFERENCE REGION AND PERIPHERAL REGION
TH1: FIRST THRESHOLD VALUE (REFERENCE VALUE)

FIG. 15

<COMPARATIVE EXAMPLE>

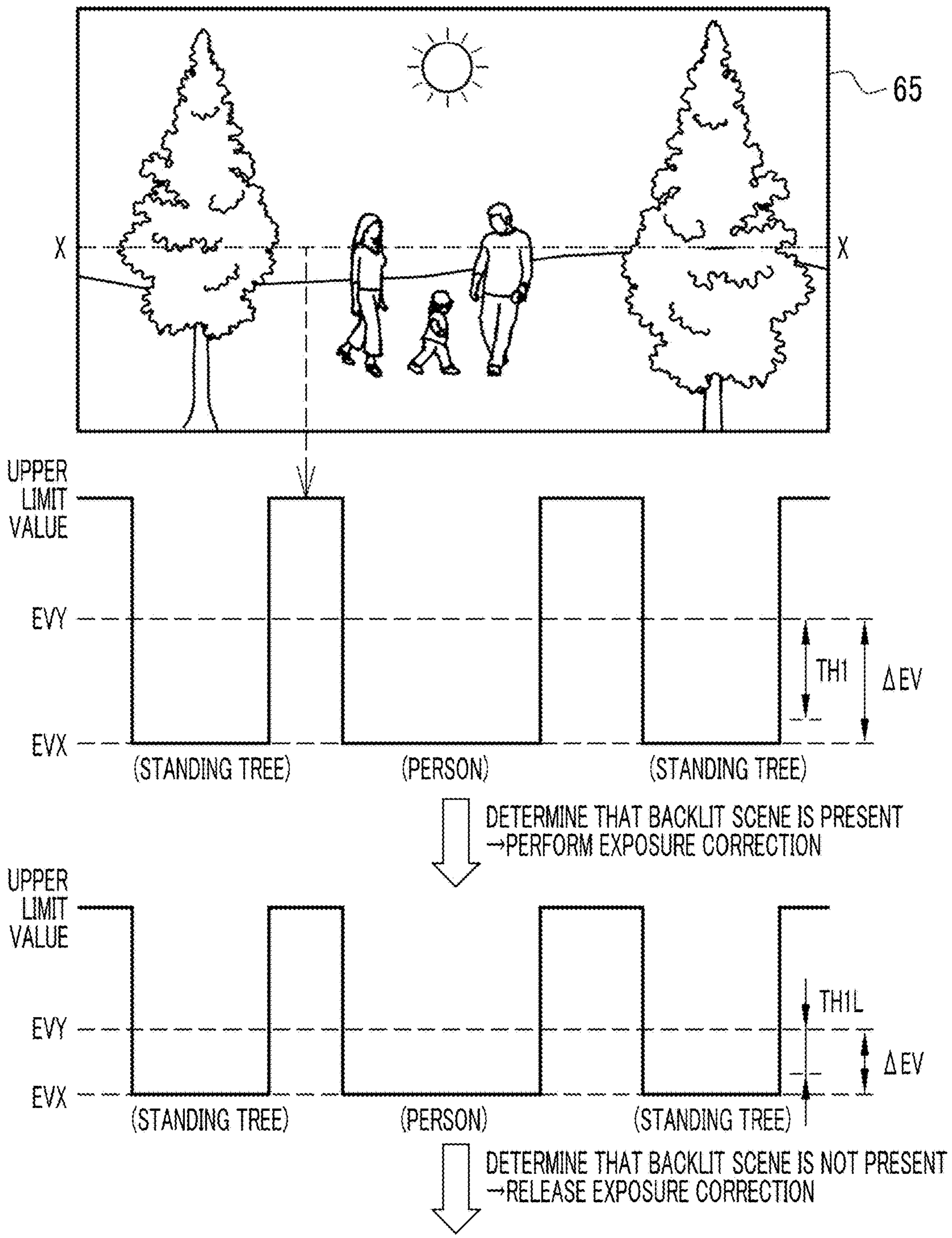

REPEAT UNTIL IMAGED SCENE CHANGES THEREAFTER

* EVX: REPRESENTATIVE VALUE OF REGION EXPOSURE VALUE OF REFERENCE REGION
EVY: REPRESENTATIVE VALUE OF REGION EXPOSURE VALUE OF PERIPHERAL REGION
ΔEV: DIFFERENCE BETWEEN REPRESENTATIVE VALUES OF REGION EXPOSURE VALUES OF REFERENCE REGION AND PERIPHERAL REGION
TH1L: FIRST THRESHOLD VALUE (VALUE LOWER THAN REFERENCE VALUE)

REGION DESIGNATED BY USER → REFERENCE REGION

REGION OTHER THAN REGION DESIGNATED BY USER → PERIPHERAL REGION

BACK LIGHT CORRECTING DEVICE, METHOD OF OPERATING BACK LIGHT CORRECTING DEVICE, PROGRAM OF OPERATING BACK LIGHT CORRECTING DEVICE, AND IMAGING APPARATUS

CROSS-REFERENCE TO RELATED APPLICATIONS

The present application claims priority under 35 U.S.C. § 119 to Japanese Patent Application No., 2023-107559 filed on Jun. 29, 2023. The above application is hereby expressly incorporated by reference, in its entirety, into the present application.

BACKGROUND

1. Technical Field

The technique of the present disclosure relates to a back light correcting device, a method of operating a back light correcting device, a program of operating a back light correcting device, and an imaging apparatus.

2. Description of the Related Art

JP6817590B discloses an imaging apparatus including an imaging section that captures an image of a subject to generate image data, a first detection section that detects a face region corresponding to a face of the subject in the image data, a second detection section that detects a subject region corresponding to at least a part of the subject in the image data, and a controller that controls exposure by photometry relating to the image data. In a case where the first detection section detects the face region, the controller corrects the exposure in accordance with the photometry of the detected face region. Further, in a case where the first detection section does not detect the face region and the second detection section detects the subject region corresponding to the subject of the detected face region thereafter, correction of the exposure continues in accordance with the photometry of the detected face region.

SUMMARY

One embodiment according to the technique of the present disclosure provides a back light correcting device, a method of operating a back light correcting device, a program of operating a back light correcting device, and an imaging apparatus capable of performing appropriate back light correction.

A back light correcting device according to an aspect of the present disclosure comprises a processor, in which the processor is configured to: perform first determination to determine that an imaged scene of an image is a backlit scene, in which light is emitted from behind a subject, in a case where a difference in luminance between a reference region serving as a reference for back light correction in the image and a peripheral region of the reference region is equal to or greater than a first threshold value which is set in advance; perform the back light correction by performing exposure correction in a direction in which a luminance of the entire image increases in a case where it is determined by the first determination that the imaged scene is the backlit scene; perform second determination to determine whether or not a saturated region is present in the image; and set the first threshold value to a value lower than a value, which is obtained in a case where it is determined that the saturated region is not present, in a case where it is determined by the first determination that the imaged scene is the backlit scene and it is determined by the second determination that the saturated region is present.

It is preferable that the processor is configured to: set the peripheral region as a target of the second determination.

It is preferable that the processor is configured to: perform the second determination on the basis of a result of comparison between a second threshold value, which is set in advance, and a difference in luminance between the entire image and the peripheral region among a plurality of divided regions obtained by dividing the image.

It is preferable that the processor is configured to: determine that the saturated region is present in a case where a specified number or more of the peripheral regions, in which the difference in luminance between the entire image and the peripheral region is equal to or greater than the second threshold value, are present.

It is preferable that the reference region is any one of a central region of the image, a region in which the subject is detected, or a region which is designated by a user.

An imaging apparatus according to the present disclosure comprises the above-mentioned back light correcting device.

It is preferable that the imaging apparatus of the present disclosure is a surveillance camera.

A method of operating a back light correcting device according to an aspect of the present disclosure comprises: performing first determination to determine that an imaged scene of an image is a backlit scene, in which light is emitted from behind a subject, in a case where a difference in luminance between a reference region serving as a reference for back light correction in the image and a peripheral region of the reference region is equal to or greater than a threshold value which is set in advance; performing the back light correction by performing exposure correction in a direction in which a luminance of the entire image increases in a case where it is determined by the first determination that the imaged scene is the backlit scene; performing second determination to determine whether or not a saturated region is present in the image; and setting the threshold value to a value lower than a value, which is obtained in a case where it is determined that the saturated region is not present, in a case where it is determined by the first determination that the imaged scene is the backlit scene and it is determined by the second determination that the saturated region is present.

An program of operating a back light correcting device according to an aspect of the present disclosure causes a computer to execute processing comprising: performing first determination to determine that an imaged scene of an image is a backlit scene, in which light is emitted from behind a subject, in a case where a difference in luminance between a reference region serving as a reference for back light correction in the image and a peripheral region of the reference region is equal to or greater than a threshold value which is set in advance; performing the back light correction by performing exposure correction in a direction in which a luminance of the entire image increases in a case where it is determined by the first determination that the imaged scene is the backlit scene; performing second determination to determine whether or not a saturated region is present in the image; and setting the threshold value to a value lower than a value, which is obtained in a case where it is determined that the saturated region is not present, in a case where it is determined by the first determination that the imaged scene is the backlit scene and it is determined by the second determination that the saturated region is present.

BRIEF DESCRIPTION OF THE DRAWINGS

Exemplary embodiments according to the technique of the present disclosure will be described in detail based on the following figures, wherein:

FIG. 7 is a diagram showing exposure value information;

FIG. 8 is a flowchart showing a processing procedure of a first determination section;

FIG. 11 is a flowchart showing a processing procedure of a second determination section;

FIG. 15 is a schematic diagram of luminance in a region along the X-X line in the image shown in FIG. 6, and is a diagram showing the present example in which the first threshold value is set and changed to the reference value and a value lower than the reference value;

DETAILED DESCRIPTION

First Embodiment

Figure 1:
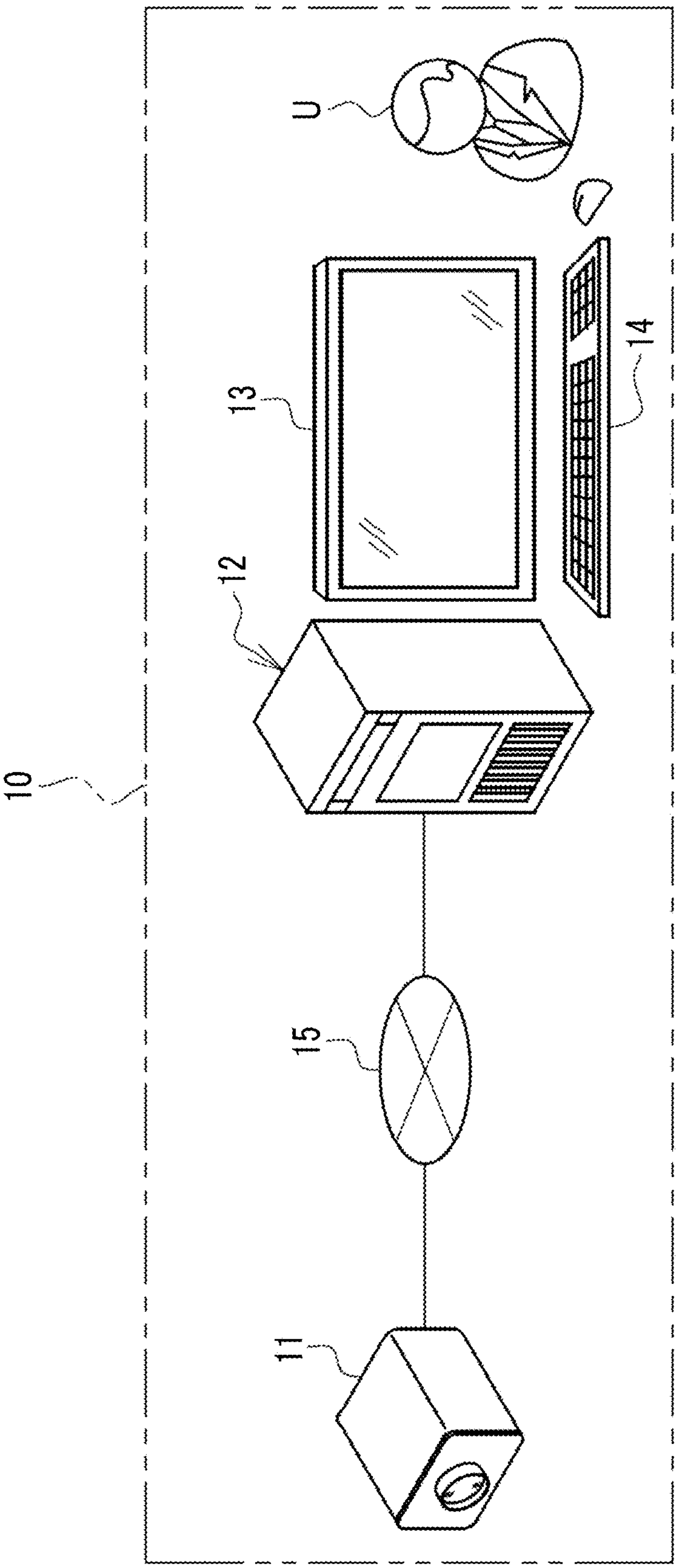
FIG. 1 is a diagram showing a surveillance camera system.

For example, as shown in FIG. 1, a surveillance camera system 10 comprises a surveillance camera 11 and an administration device 12. The surveillance camera 11 is provided in a street or inside a building and captures an image of a state of the street or the inside of the building. The administration device 12 is provided in a control room in which a user U who is an administrator of the surveillance camera 11 is resident. The administration device 12 has a monitor 13 that displays an image 65 (refer to FIGS. 4 and 6) from the surveillance camera 11, and an input device 14 such as a keyboard and a mouse for inputting various operation instructions to the surveillance camera 11. The surveillance camera 11 and the administration device 12 are connected to each other via a network 15. The network 15 is, for example, a wide area network (WAN) such as the Internet or a public communication network. It should be noted that, in FIG. 1, only one surveillance camera 11 is connected to the administration device 12, but a plurality of surveillance cameras 11 may be connected to the administration device 12.

Figure 2:
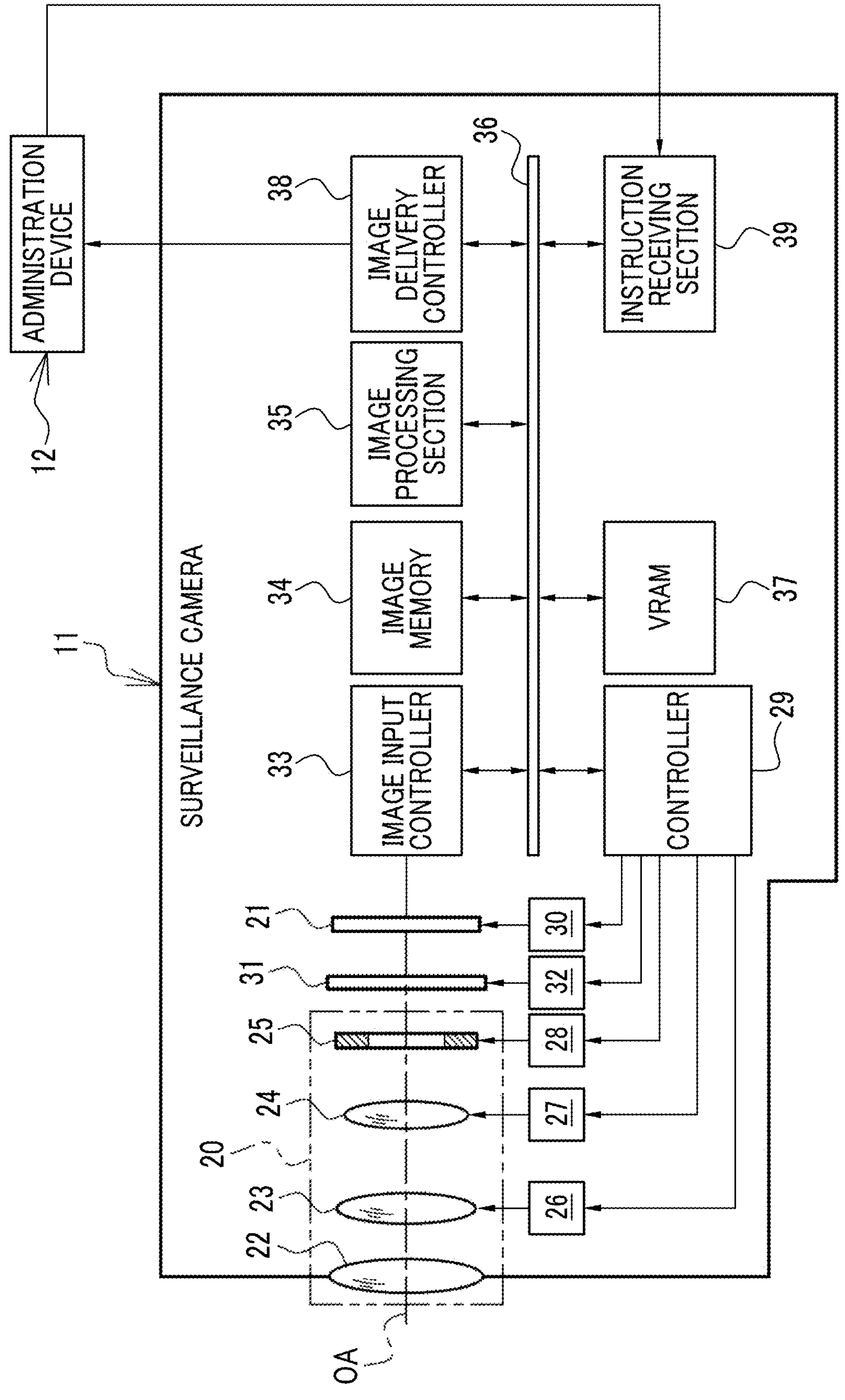
FIG. 2 is a block diagram of a surveillance camera.

As shown in FIG. 2 as an example, the surveillance camera 11 includes an imaging optical system 20 and an imaging element 21. The imaging optical system 20 has a plurality of types of lenses for forming an image of subject light on the imaging element 21. Specifically, the imaging optical system 20 has an objective lens 22, a focus lens 23, and a zoom lens 24. Each of these lenses 22 to 24 is disposed in this order from an object side (subject side) toward an image formation side (imaging element 21 side). Although simplified in FIG. 1, each of the lenses 22 to 24 is actually a lens group in which a plurality of lenses are combined. The imaging optical system 20 also has a stop 25. The stop 25 is disposed closest to the image formation side in the imaging optical system 20. The focus lens 23 is provided with a focus lens driving mechanism 26, the zoom lens 24 is provided with a zoom lens driving mechanism 27, and the stop 25 is provided with a stop aperture adjustment mechanism 28.

The focus lens driving mechanism 26 holds the focus lens 23, and includes a cam ring for focusing in which a cam groove is formed on the outer periphery of the focus lens 23, a motor for focusing that rotates the cam ring for focusing around an optical axis OA to move the cam ring for focusing along the optical axis OA, a driver of the motor for focusing, and the like. Similarly, the zoom lens driving mechanism 27 holds the zoom lens 24, and includes a cam ring for zoom in which a cam groove is formed on the outer periphery of the zoom lens 24, a motor for zooming that rotates the cam ring for zoom around the optical axis OA to move the cam ring for zoom along the optical axis OA, a driver of the motor for zooming, and the like.

The stop 25 is a so-called iris stop configured by combining a plurality of stop leaf blades. The stop 25 opens and closes, by moving the plurality of stop leaf blades at the same time by a cam mechanism, a central opening formed by inner edges of the plurality of the stop leaf blades, that is, changes an aperture of the opening (hereinafter denoted as aperture of the stop 25) to adjust an amount of light to be passed therethrough. The stop aperture adjustment mechanism 28 includes a motor for stop that opens and closes the stop leaf blades, a driver of the motor for stop, and the like.

The motor for focusing, the motor for zooming, and the motor for stop are, for example, stepping motors. In such a case, positions of the focus lens 23 and the zoom lens 24 on the optical axis OA and an aperture of the stop 25 can be derived from amounts of driving of the motor for focusing, the motor for zooming, and the motor for stop. It should be noted that a position sensor may be provided to detect a position of the focus lens 23 and a position of the zoom lens 24, instead of the amounts of driving of the motor for focusing and the motor for zooming.

An electric component, such as the driver, of the motors (motor for focusing, motor for zooming, and motor for stop) of the driving mechanisms 26 to 28 is connected to the controller 29. The electric component of each of the driving mechanisms 26 to 28 is driven under control of the controller 29. More specifically, the controller 29 issues a driving signal in response to various operation instructions input via the input device 14 of the administration device 12 to drive electric components of the driving mechanisms 26 to 28. For example, in a case where an operation instruction to change an angle of view to a telephoto side is input, the controller 29 issues the driving signal to the driver of the motor for zooming of the zoom lens driving mechanism 27 to move the zoom lens 24 to the telephoto side.

The motor for focusing, the motor for zooming, and the motor for stop output amounts of driving to the controller 29. The controller 29 derives a position of the focus lens 23 and a position of the zoom lens 24 on the optical axis OA and an aperture of the stop 25 from the amounts of driving.

The imaging element 21 is, for example, a complementary metal-oxide-semiconductor (CMOS) image sensor, and has an imaging surface that images the subject light. The imaging surface is formed by a plurality of pixels which are arranged two-dimensionally. The pixel accumulates signal charge corresponding to the subject light and outputs an image signal (voltage signal) corresponding to the signal charge. The imaging element 21 is disposed such that a center of the imaging surface matches with the optical axis OA and the imaging surface is orthogonal to the optical axis OA. It should be noted that the terms "match" and "orthogonal" as used herein mean not only perfect match and orthogonality but also match and orthogonality in a sense including an error generally allowed in the technical field to which the technique of the present disclosure belongs.

An imaging element driver 30 is connected to the imaging element 21. The imaging element driver 30 is connected to the controller 29. The imaging element driver 30 performs, under the control of the controller 29, supplying of a vertical scanning signal and a horizontal scanning signal to the imaging element 21, or the like to control an imaging timing of the subject light by the imaging element 21. Further, the imaging element driver 30 sets a gain that is given to the image signal which is output from the pixels and that corresponds to international organization for standardization (ISO) sensitivity.

A shutter 31 is provided between the imaging optical system 20 and the imaging element 21. The shutter 31 is, for example, a focal-plane shutter that has a front curtain and a rear curtain. A shutter driving mechanism 32 is connected to the shutter 31. The shutter driving mechanism 32 includes an electromagnet that holds the front curtain and the rear curtain and releases the holding thereof to cause the front curtain and the rear curtain to travel, a driver of the electromagnet, and the like. The shutter driving mechanism 32 is driven to open and close the shutter 31 under the control of the controller 29. It should be noted that the shutter is not limited to the mechanical shutter 31 described as an example, and an electronic shutter may be used. In particular, in the surveillance camera, the electronic shutter is often employed.

The controller 29 is connected to each section such as an image input controller 33, an image memory 34, and an image processing section 35, through a busline 36. In addition, a video random access memory (VRAM) 37, an image delivery controller 38, an instruction receiving section 39, and the like are connected to the busline 36. It should be noted that, although not shown, the busline 36 is also connected to a power supply section that supplies power to each section of the surveillance camera 11, an external communication interface (I/F) that communicates with an external device via a connection terminal, such as a universal serial bus (USB) terminal, or a wireless communication I/F, and the like.

An image 65 based on an image signal, which is obtained by imaging the subject light, is input to the image input controller 33 from the imaging element 21. The image input controller 33 outputs the image 65 to the image memory 34. The image memory 34 is, for example, a synchronous dynamic random access memory (SDRAM), and temporarily stores the image 65.

The image processing section 35 reads the unprocessed image 65 from the image memory 34. The image processing section 35 performs various types of image processing on the image 65. The various types of image processing are, for example, offset correction processing, sensitivity correction processing, pixel interpolation processing, white balance correction processing, gamma correction processing, demosaicing, luminance signal and color difference signal generation processing, contour enhancement processing, and color correction processing. The image processing section 35 writes the image 65, which is obtained after various types of image processing, back to the image memory 34.

Regarding the image 65 after various types of image processing, the image 65, which is to be displayed on the monitor 13 of the administration device 12, is input to the VRAM 37 from the image memory 34. The VRAM 37 has a region in which the images 65 for two consecutive frames are stored. The images 65 stored in the VRAM 37 is sequentially rewritten with new images 65. The VRAM 37 sequentially outputs the new images 65 of the images 65 for two consecutive frames to the image delivery controller 38.

The image delivery controller 38 performs control of delivering the images 65 from the VRAM 37 to the administration device 12. Thereby, the user U is able to visually recognize the image 65 via the monitor 13 of the administration device 12. A display frame rate of the image 65 is, for example, in a range of 5 frames per second (fps) to 30 fps.

The instruction receiving section 39 receives various operation instructions which are input from the user U via the input device 14 of the administration device 12. The instruction receiving section 39 outputs the received various operation instructions to the controller 29 through the busline 36.

Examples of the various operation instructions include an operation instruction to manually set the aperture of the stop 25, the ISO sensitivity, and the shutter speed of the shutter 31, in addition to the operation instruction to change the angle of view described above. Further, there are also an operation instruction to perform still image capturing or motion picture capturing of the image 65, an operation instruction to operate a pan-tilt mechanism (not shown in the drawing) to change the direction of the surveillance camera 11, or the like.

Figure 3:
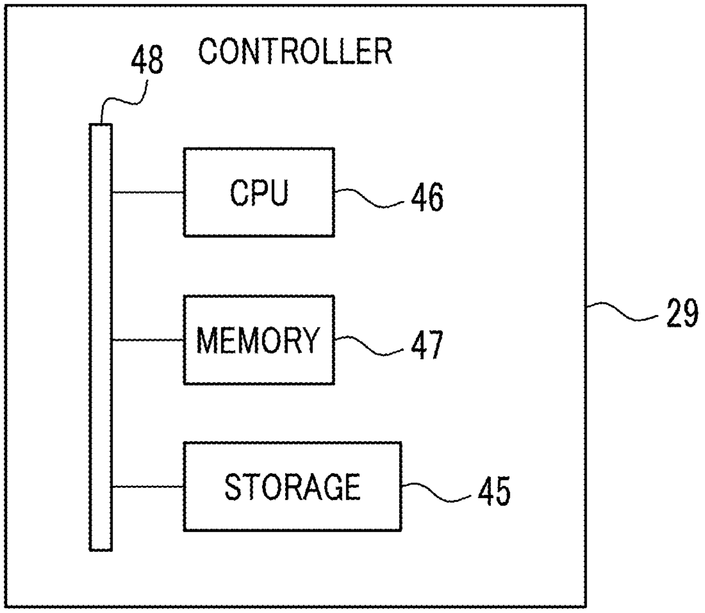
FIG. 3 is a block diagram of a controller.

As shown in FIG. 3 as an example, the controller 29 includes a storage 45, a central processing unit (CPU) 46, and a memory 47. The storage 45, the CPU 46, and the memory 47 are connected to each other via a busline 48. The controller 29 is an example of a "back light correcting device" and a "computer" according to the technique of the present disclosure.

The storage 45 is a non-volatile storage device such as an electrically erasable programmable read-only memory (EEPROM). The storage 45 stores various programs, various types of data associated with the various programs, and the like. It should be noted that, instead of the EEPROM, a ferroelectric random access memory (FeRAM) or a magnetoresistive random access memory (MRAM) may be used as the storage 45.

The memory 47 is a work memory used by the CPU 46 to execute processing. The CPU 46 loads the program which is stored in the storage 45 to the memory 47 and executes processing corresponding to the program. Thereby, the CPU 46 integrally controls each section of the surveillance camera 11. The CPU 46 is an example of "processor" according to the technique of the present disclosure. It should be noted that the memory 47 may be built in the CPU 46.

Figure 4:
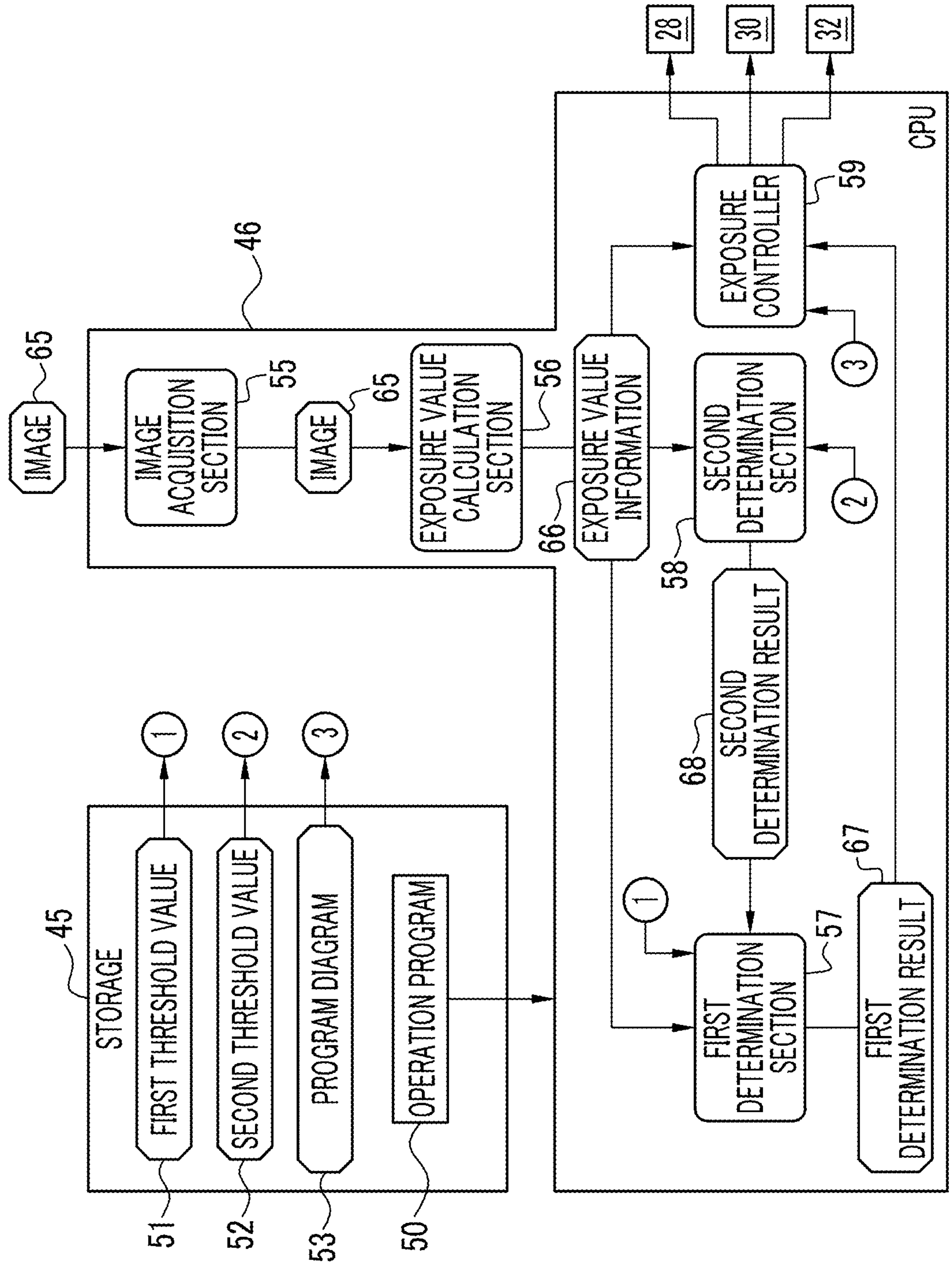
FIG. 4 is a block diagram showing a processing section of a CPU.

As shown in FIG. 4 as an example, an operation program 50 is stored in the storage 45. The operation program 50 is a program for causing the CPU 46 to execute back light correction and the like. That is, the operation program 50 is an example of a "program of operating the back light correcting device" according to the technique of the present disclosure. A first threshold value 51, a second threshold value 52, and a program diagram 53 are also stored in the storage 45, in addition to the operation program 50. The first threshold value 51 is an example of a "threshold value" according to the technique of the present disclosure.

In a case where the operation program 50 is activated, the CPU 46 cooperates with the memory 47 and the like to function as an image acquisition section 55, an exposure value calculation section 56, a first determination section 57, a second determination section 58, and an exposure controller 59.

The image acquisition section 55 acquires the image 65 subjected to the image processing by reading out the image 65 from the image memory 34. The image acquisition section 55 outputs the image 65 to the exposure value calculation section 56.

The exposure value calculation section 56 calculates an exposure value according to the luminance of the image 65. The exposure value calculation section 56 generates the exposure value information 66 in which a calculation result of the exposure value is summarized. The exposure value calculation section 56 outputs the exposure value information 66 to the first determination section 57, the second determination section 58, and the exposure controller 59.

The first threshold value 51 is input to the first determination section 57. The first determination section 57 performs the first determination using the first threshold value 51 and the exposure value information 66. The first determination is determination as to whether or not the imaged scene of the image 65 is a backlit scene. The backlit scene is an imaged scene in which the periphery of the subject is reflected bright and the subject is reflected dark due to the reception of light from behind the subject. The first determination section 57 outputs a first determination result 67, which is a result of the first determination, to the exposure controller 59.

The second threshold value 52 is input to the second determination section 58. The second determination section 58 performs the second determination using the second threshold value 52 and the exposure value information 66. The second determination is determination as to whether or not a saturated region is present in the image 65 (hereinafter, referred to as a saturated region). The saturated region is a region which is reflected in white after the image signals of each color of RGB reach an upper limit value, that is, a so-called overexposed region. The second determination section 58 outputs a second determination result 68, which is a result of the second determination, to the first determination section 57.

The program diagram 53 is input to the exposure controller 59. The exposure controller 59 performs exposure control for obtaining the image 65 with a standard exposure on the basis of the program diagram 53, the exposure value information 66, and the first determination result 67. More specifically, the exposure controller 59 is able to derive the aperture of the stop 25 for obtaining the image 65 having the standard exposure, the ISO sensitivity, and the shutter speed of the shutter 31, from the program diagram 53 and the entirety exposure value of the exposure value information 66 (refer to FIG. 7). The exposure controller 59 outputs a driving signal for setting the derived aperture, ISO sensitivity, and shutter speed of the stop 25 to the stop aperture adjustment mechanism 28, the imaging element driver 30, and the shutter driving mechanism 32. It should be noted that the image 65 using the standard exposure refers to an image having the same luminance as in a case where the image is actually viewed through the eyes.

Figure 5:
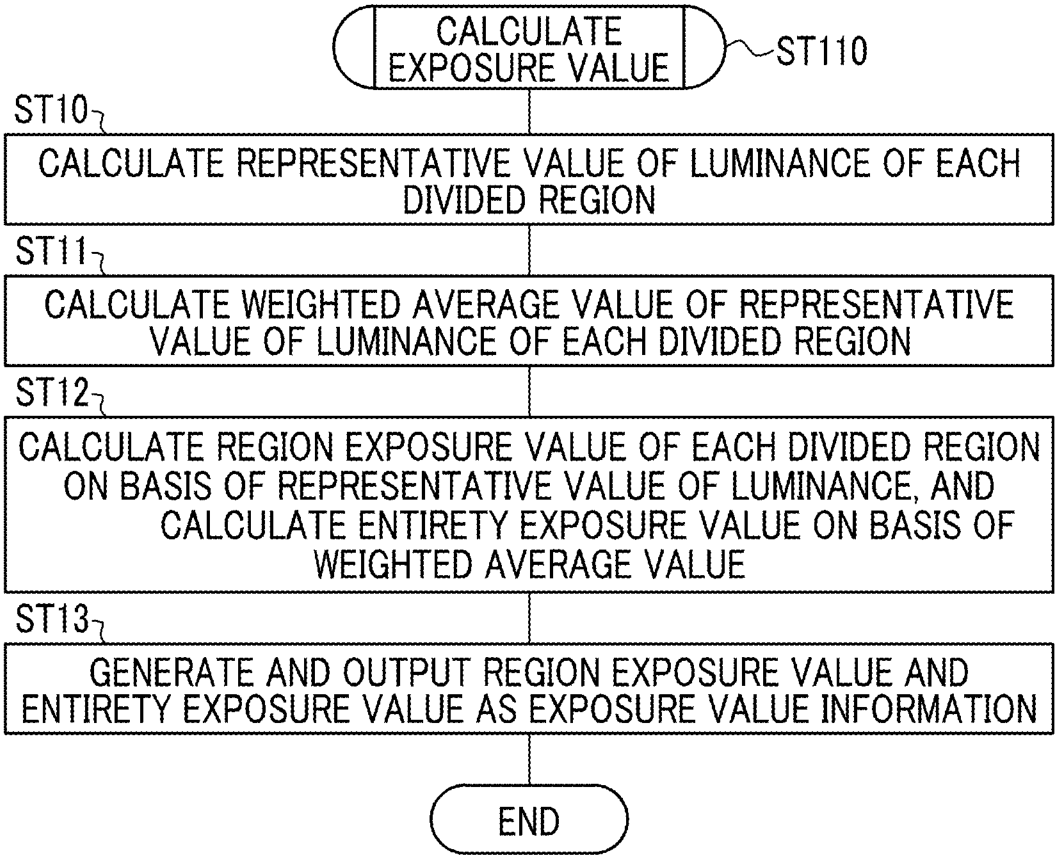
FIG. 5 is a flowchart showing a processing procedure of an exposure value calculation section.
Figure 6:
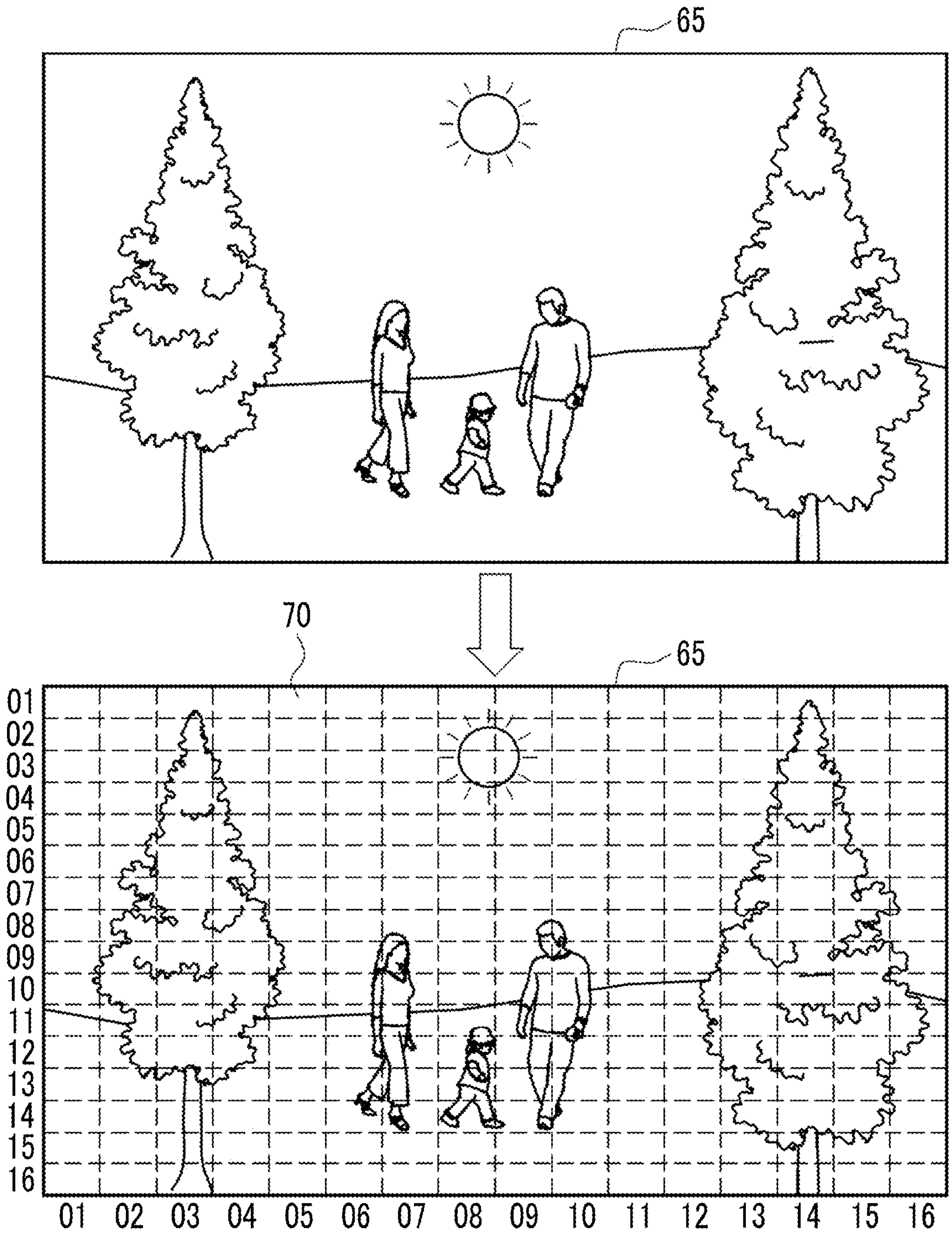
FIG. 6 is a diagram showing a divided region.

The exposure value calculation section 56 calculates an exposure value according to the procedure shown in FIG. 5 as an example. First, the exposure value calculation section 56 calculates a representative value of luminance for each of a plurality of divided regions 70 which is obtained by dividing the image 65 as shown in FIG. 6 as an example (Step ST10). The representative value of the luminance is, for example, an average value or a median value of luminance signals generated from the image signals which are output by the pixels in the divided regions 70. FIG. 6 shows an example of the image 65 showing a state where family members are walking between two standing trees on a lawn of a park where the sun shines behind. Further, FIG. 6 shows the example in a case where the image 65 is divided into 16×16=256 equal parts and 256 divided regions 70 are provided. It should be noted that the number of divided regions 70 is not limited to 256 in the example. The number of data items may be set to 8×8=64 or 24×24=576.

The exposure value calculation section 56 calculates a weighted average value of the representative values of the luminances of the respective divided regions 70 (Step ST11). The weighted average value is calculated by adding up values, which are obtained by multiplying the representative values of the luminances of the respective divided regions 70 by weights which are set in advance for the respective divided regions 70, and by dividing the obtained value by the number of the divided regions 70. The weight is set, for example, to gradually decrease from the center of the image 65 to the periphery.

The exposure value calculation section 56 calculates an exposure value of each divided region 70 (hereinafter, referred to as a region exposure value), on the basis of the representative value of the luminance of each divided region 70 (Step ST12). Further, the exposure value calculation section 56 calculates an exposure value of the entire image 65 (hereinafter, referred to as the entirety exposure value), on the basis of the weighted average value (Step ST12). As shown in FIG. 7 as an example, the exposure value calculation section 56 collectively generates the region exposure values and the entirety exposure value as the exposure value information 66, and outputs the exposure value information 66 (Step ST13). It should be noted that the numbers such as "0101" and "0102" attached to the divided regions in FIG. 7 are a list of numbers assigned to the matrix of the divided regions 70 in FIG. 6. For example, "0403" represents the divided region 70 of the fourth row and the third column, and "0709" represents the divided region 70 of the seventh row and the ninth column.

Figure 9:
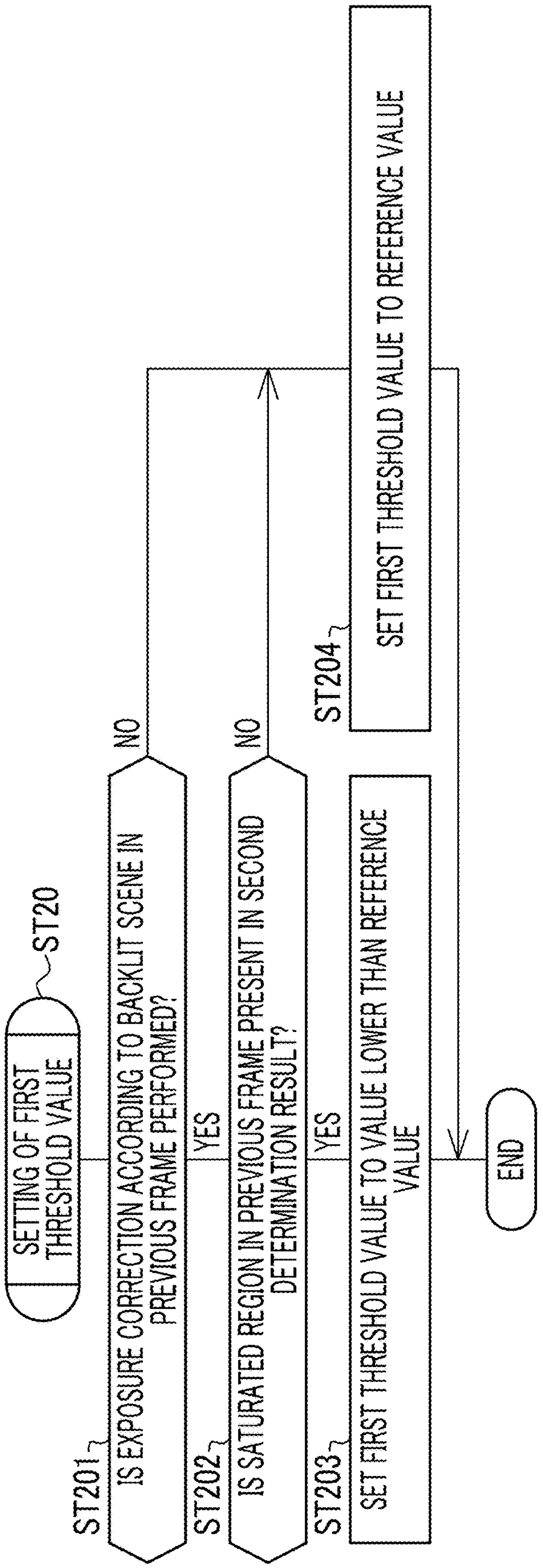
FIG. 9 is a flowchart showing a procedure of setting a first threshold value.

The first determination section 57 performs the first determination in the procedure shown in FIGS. 8 and 9 as an example. First, the first determination section 57 sets the first threshold value 51 (Step ST20). As shown in FIG. 9, the exposure controller 59 performs the exposure correction according to the backlit scene in the previous frame. In addition, in a case where the second determination result 68 in the previous frame has a content indicating that a saturated region is present in the image 65 (YES in both Steps ST201 and ST202), the first determination section 57 sets the first threshold value 51 to a value lower than a reference value (Step ST203). In contrast, in a case where the exposure controller 59 does not perform the exposure correction according to the backlit scene in the previous frame (NO in Step ST201), the first determination section 57 sets the first threshold value 51 to the reference value (Step ST204). Although the exposure controller 59 performs exposure correction according to the backlit scene in the previous frame, also in a case where the second determination result 68 in the previous frame has a content indicating that a saturated region is not present in the image 65 (YES in Step ST201, and NO in Step ST202), the first determination section 57 sets the first threshold value 51 to the reference value (Step ST204). It should be noted that the reference value of the first threshold value 51 is set to, for example, 2 EV, and the value lower than the reference value is set to, for example, 0.5 EV.

In FIG. 8, after the first threshold value 51 is set, the first determination section 57 calculates a representative value of a region exposure value of a reference region serving as a reference for back light correction and a peripheral region of the reference region, on the basis of region exposure values of the exposure value information 66 (Step ST21). For example, as shown by the solid lines and hatching in FIG. 10, the reference region is 4×4=16 divided regions 70 at the center of the image 65, that is, the central region of the image 65. As expressed in number, the reference region is each of the divided regions 70 of "0707", "0708", "0709", "0710", "0807", "0808", "0809", "0810", "0907", "0908", "0909", "0910", "1007", "1008", "1009", and "1010". On the other hand, the peripheral region is each of 240 divided regions 70 other than the above-mentioned 16 divided regions 70. The representative value of the region exposure values of the reference regions is an average value, a median value, or the like of the region exposure values of the 16 divided regions 70. Similarly, the representative value of the region exposure values of the peripheral regions is an average value, a median value, or the like of the region exposure values of 240 divided regions 70 other than the above-mentioned 16 divided regions 70.

The first determination section 57 calculates a difference between the representative values of the region exposure values of the reference regions and the peripheral regions by subtracting the representative value of the region exposure values of the reference regions from the representative value of the region exposure values of the peripheral regions (Step ST22). Regarding the difference between the representative values of the region exposure values of the reference regions and the peripheral regions, the difference in a case where the imaged scene of the image 65 is a backlit scene is greater than the difference in the other case. The difference between the representative values of the region exposure values of the reference regions and the peripheral regions is an example of the "differences in luminance between the reference regions and the peripheral regions" according to the technique of the present disclosure. It should be noted that, as "the differences in luminance between the reference regions and the peripheral regions", a difference between representative values of the luminance signals of the reference regions and the peripheral regions may be used.

The first determination section 57 compares the difference between the representative values of the region exposure values of the reference regions and the peripheral regions with the first threshold value 51 which is set in Step ST20 (Step ST23). In a case where the difference between the representative values of the region exposure values of the reference regions and the peripheral regions is equal to or greater than the first threshold value 51 (YES in Step ST24), the first determination section 57 determines that the imaged scene of the image 65 is a backlit scene. (Step ST25). In contrast, in a case where the difference between the representative values of the region exposure values of the reference regions and the peripheral regions is less than the first threshold value 51 (NO in Step ST24), the first determination section 57 determines that the imaged scene of the image 65 is not a backlit scene. (Step ST26). The first determination section 57 outputs the first determination result 67 (Step ST27).

The second determination section 58 performs the second determination in a procedure shown in FIG. 11 as an example. First, the second determination section 58 calculates a difference between the entirety exposure value and the region exposure value of the peripheral region for each peripheral region by subtracting the entirety exposure value from the region exposure value of each peripheral region (Step ST30). As can be seen from the processing of Step ST30, targets of the second determination are only the peripheral regions, and the reference regions are excluded from the targets of the second determination. The differences between the entirety exposure value and the region exposure values of the peripheral regions are an example of "differences in luminance between the entire image and the peripheral regions" according to the technique of the present disclosure. It should be noted that, as the "differences in luminance between the entire image and the peripheral regions", a difference between a representative value of the luminance signals of the peripheral region and a representative value of the luminance signals of the entire image 65 may be used.

The second determination section 58 compares the differences between the entirety exposure value and the region exposure values of the peripheral regions with the second threshold value 52 (Step ST31). Then, the peripheral regions, of which the differences between the region exposure values and the entirety exposure value are equal to or greater than the second threshold value 52, are counted (Step ST32).

In a case where the number of peripheral regions, of which the differences between the region exposure values and the entirety exposure value are equal to or greater than the second threshold value 52, is equal to or greater than a specified number (YES in Step ST33), the second determination section 58 determines that a saturated region is present in the image 65 (Step ST34). In contrast, in a case where the number of peripheral regions, of which the differences between the region exposure values and the entirety exposure value are equal to or greater than the second threshold value 52, is less than the specified number (NO in Step ST33), the second determination section 58 determines that a saturated region is not present in the image 65 (Step ST35). The second determination section 58 outputs the second determination result 68 (Step ST36). It should be noted that the second threshold value 52 is, for example, 2.5 EV, and the specified number is, for example, 10.

Figure 12A:
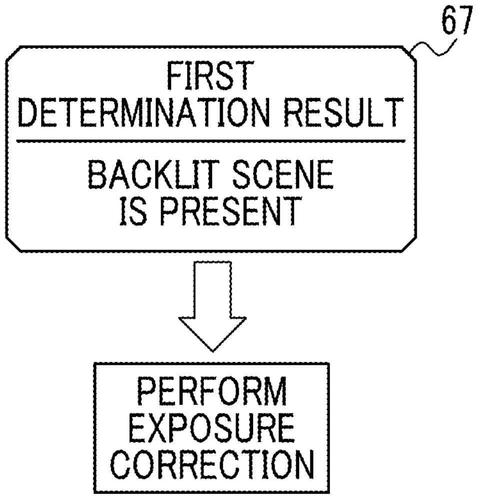
FIGS. 12A and 12B are diagrams showing processing of an exposure controller.
Figure 12B:
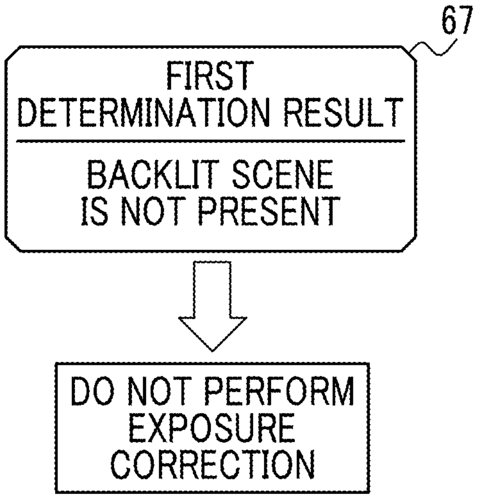

As shown in FIG. 12A as an example, in a case where the first determination result 67 has a content indicating that an imaged scene of the image 65 is a backlit scene, the exposure controller 59 performs exposure correction. In contrast, as shown in FIG. 12B, in a case where the first determination result 67 has a content indicating that the imaged scene of the image 65 is not the backlit scene, the exposure controller 59 does not perform the exposure correction.

The exposure correction executed in a case where the imaged scene of the image 65 is a backlit scene is processing of increasing the luminance of the entire image 65, and is processing of correcting the back light. More specifically, exposure correction is processing of correcting the aperture of the stop 25, ISO sensitivity, and shutter speed of the shutter 31, which are derived from the program diagram 53 and the entirety exposure value of the exposure value information 66, in a direction in which the luminance of the entire image 65 increases. "The correction in the direction in which the luminance of the entire image 65 increases" means that the correction is performed in a direction in which the aperture of the stop 25 increases, a direction in which the ISO sensitivity increases, and a direction in which the shutter speed decreases. It should be noted that a degree of increase in luminance of the entire image 65 due to the exposure correction is, for example, about +2 EV in terms of exposure value conversion.

Figure 13:
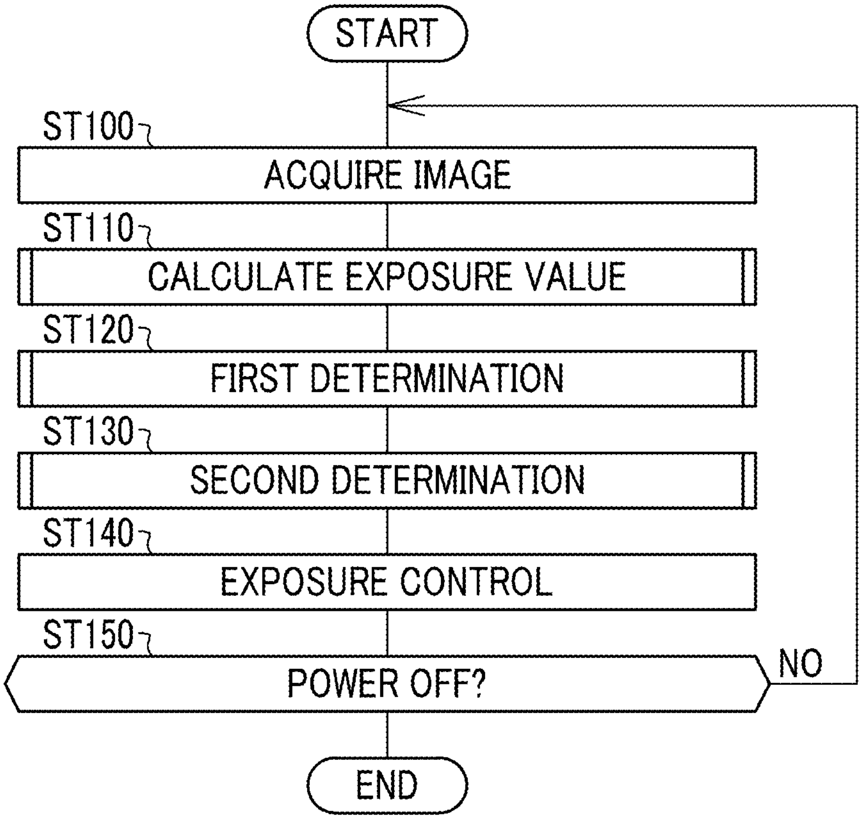
FIG. 13 is a flowchart showing a processing procedure of the CPU of the surveillance camera.

Next, an action with the configuration described above will be described with reference to the flowchart shown in FIG. 13 as an example. As shown in FIG. 4, the CPU 46 of the controller 29 functions as the image acquisition section 55, the exposure value calculation section 56, the first determination section 57, the second determination section 58, and the exposure controller 59, through activation of the operation program 50.

In the surveillance camera 11, subject light, of which an image is formed by the imaging optical system 20, is imaged by the imaging element 21, and the image 65 is output from the imaging element 21. The image processing section 35 performs various types of image processing on the image 65. The image 65, which is subjected to various types of image processing, is delivered to the administration device 12 under the control of the image delivery controller 38 and displayed on the monitor 13 of the administration device 12. Further, the image 65 is acquired by being read out by the image acquisition section 55 (Step ST100). The image 65 is output from the image acquisition section 55 to the exposure value calculation section 56.

The exposure value calculation section 56 calculates the region exposure value, which is the exposure value of each divided region, and the entirety exposure value, which is the exposure value of the entire image 65, in the procedure shown in FIG. 5 (Step ST110). The exposure value information 66, which includes the region exposure values and the entirety exposure value, is output from the exposure value calculation section 56 to the first determination section 57, the second determination section 58, and the exposure controller 59.

The first determination section 57 performs the first determination as to whether or not the imaged scene of the image 65 is a backlit scene in the procedure shown in FIGS. 8 and 9 (Step ST120). The first determination result 67 is output from the first determination section 57 to the exposure controller 59.

In the first determination, the first threshold value 51 is set to the reference value or a value lower than the reference value, on the basis of the second determination result 68 as to whether or not a saturated region is present in the image 65 by the second determination section 58. Specifically, the exposure controller 59 may not have performed the exposure correction according to the backlit scene in the previous frame. In addition, although the exposure controller 59 has performed the exposure correction according to the backlit scene in the previous frame, the second determination result 68 in the previous frame may have a content indicating that a saturated region is not present in the image 65. In such cases, the first threshold value 51 is set to a reference value. In contrast, in a case where the exposure controller 59 performs the exposure correction according to the backlit scene in the previous frame and the second determination result 68 in the previous frame has a content indicating that a saturated region is present in the image 65, the first threshold value 51 is set to a value lower than the reference value. It should be noted that, in the first determination section 57, the first threshold value 51 is reset to the reference value in the following cases: the second determination section 58 may determine that a saturated region is present in the image 65; and the second determination section 58 may determine that a saturated region is not present in the image 65 since the imaged scene is changed to a state where the first threshold value 51 is set to a value lower than the reference value in the first determination section 57.

The second determination section 58 performs the second determination as to whether or not a saturated region is present in the image 65 in the procedure shown in FIG. 11 (Step ST130). The second determination result 68 is output from the second determination section 58 to the first determination section 57.

The exposure controller 59 performs the exposure control which is based on the program diagram 53 and the entirety exposure value (Step ST140). In such a case, as shown in FIG. 12A, in a case where the first determination result 67 has a content indicating that the imaged scene of the image 65 is a backlit scene, the exposure correction is performed in the direction in which the luminance of the entire image 65 increases. The processing of Steps ST100 to ST140 is repeatedly continued while power of the surveillance camera 11 is not turned off (NO in Step ST150).

As described above, the first determination section 57 of the CPU 46 of the controller 29 performs the first determination to determine that the imaged scene of the image 65 is a backlit scene in a case where the differences between the representative value of the region exposure values of the reference regions serving as the references for back light correction in the image 65 and the representative value of the region exposure values of the peripheral regions of the reference regions are equal to or greater than the first threshold value 51 which is set in advance. The exposure controller 59 performs the back light correction by performing exposure correction in the direction in which the luminance of the entire image 65 increases in a case where it is determined by the first determination that the imaged scene is the backlit scene. The second determination section 58 performs the second determination to determine whether or not a saturated region is present in the image 65. The first determination section 57 sets the first threshold value 51 to a value lower than a value, which is obtained in a case where it is determined that the saturated region is not present, in a case where it is determined by the first determination that the imaged scene is the backlit scene and it is determined by the second determination that the saturated region is present.

Figure 14:
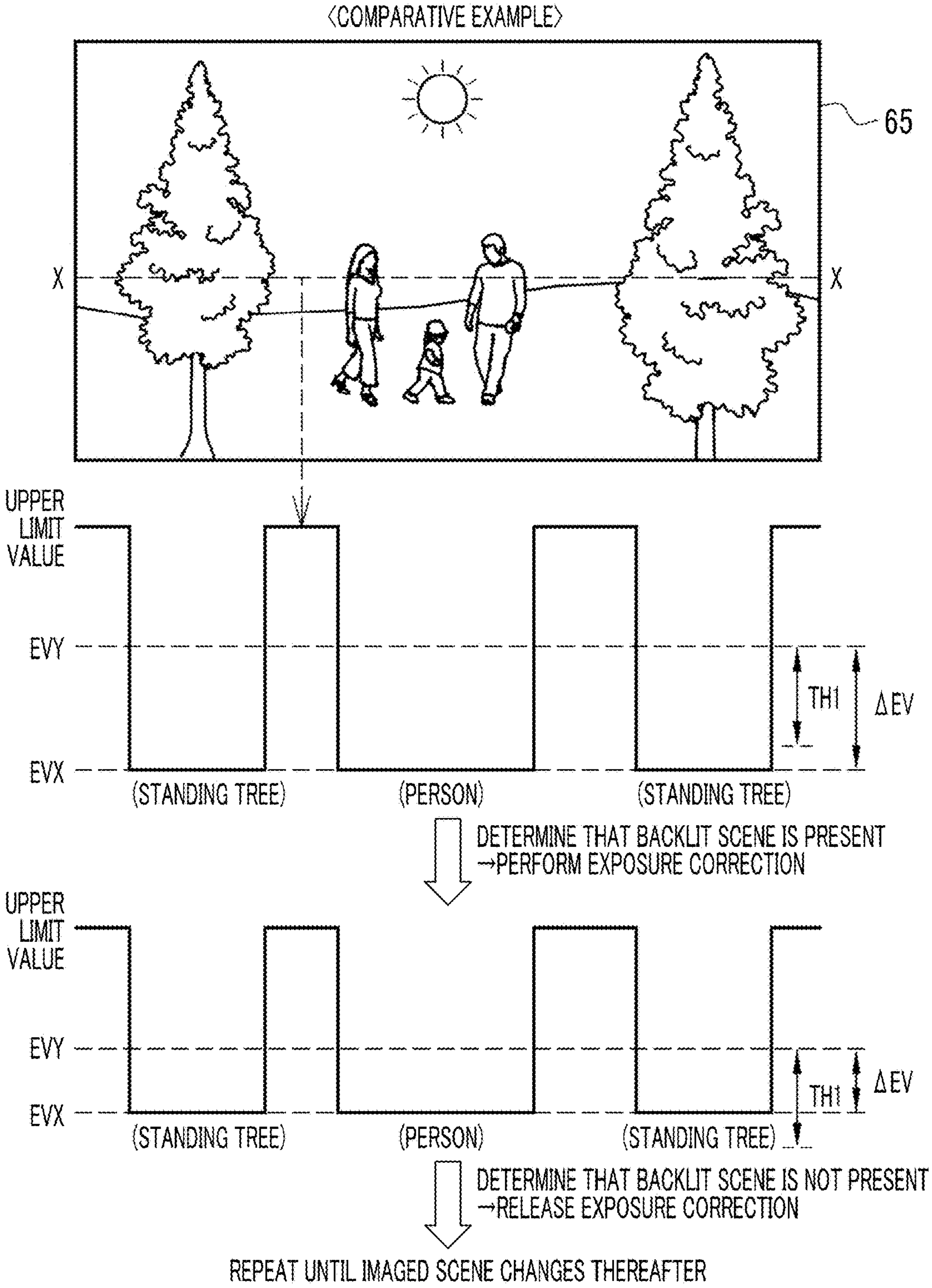
FIG. 14 is a schematic diagram of luminance in a region along an X-X line in the image shown in FIG. 6, and is a diagram showing a comparative example in which a first threshold value is fixed to a reference value.

FIGS. 14 and 15 show schematic diagrams of the luminance of the region along the X-X line of the image 65 shown in FIG. 6. FIG. 14 shows a case (comparative example) where the first threshold value 51 is fixed to the reference value. In contrast, FIG. 15 shows a case (present example) where the first threshold value is changed to the reference value and the value lower than the reference value.

The luminance of the image 65 has low values in regions of two standing trees and persons as a family, and reaches an upper limit value and is thus saturated in the other regions. The region of the persons as the family corresponds to the central region, that is, the reference region. Moreover, a difference ΔEV between a representative value EVX of the region exposure values of the reference regions and a representative value EVY of the region exposure values of the peripheral regions is equal to or greater than a first threshold value (reference value) TH1. Therefore, in the case of situations shown in FIGS. 14 and 15, the first determination section 57 determines that the imaged scene of the image 65 is a backlit scene. The exposure controller 59 performs the exposure correction. Thereby, the luminance of the entire image 65 is increased. However, the saturated region is not further increased, and only the luminances of the regions other than the saturated region including the reference regions are increased. Then, the representative value EVX of the region exposure values of the reference regions is increased, and accordingly, the difference ΔEV between the representative value EVX of the region exposure values of the reference regions and the representative value EVY of the region exposure values of the peripheral regions is decreased.

In the comparative example shown in FIG. 14, the first threshold value 51 is fixed as the reference value TH1. Thus, in a case where the exposure correction is executed, the value of EVX is increased, and accordingly, ΔEV is decreased, ΔEV is less than TH1. Then, the first determination section 57 erroneously determines that the imaged scene of the image 65 is not a backlit scene even though the imaged scene of the image 65 is actually a backlit scene. In such a case, the exposure controller 59 releases the exposure correction. Thus, the execution and release of the exposure correction are repeated until the imaged scene changes thereafter, and the luminance of the entire image 65 changes dizzyingly.

In contrast, in the present example shown in FIG. 15, the first threshold value 51 is set to a value TH1L which is lower than the reference value TH1. Thus, even in a case where the exposure correction is executed, the value of EVX is increased, and accordingly, ΔEV is decreased, the first determination section 57 is able to correctly determine that the imaged scene of the image 65 is a backlit scene. For this reason, it is possible to avoid a situation where the execution and release of the exposure correction are repeated as in the comparative example and the luminance of the entire image 65 is dizzyingly changed. Therefore, it is possible to perform appropriate back light correction.

As shown in FIG. 11, the second determination section 58 sets the peripheral regions as a target of the second determination. Therefore, it is not necessary to perform unnecessary processing.

As shown in FIG. 11, the second determination section 58 performs the second determination on the basis of the result of comparison between the preset second threshold value 52 and the differences between the entirety exposure value and the region exposure values of the peripheral regions among the plurality of divided regions 70 obtained by dividing the image 65. Therefore, validity of the second determination result 68 can be enhanced.

Further, as shown in FIG. 11, the second determination result 68 determines that the saturated region is present in a case where there are the specified number or more of the peripheral regions of which the differences between the region exposure values and the entirety exposure value are equal to or greater than the second threshold value 52. Therefore, validity of the second determination result 68 can be further enhanced.

Figure 10:
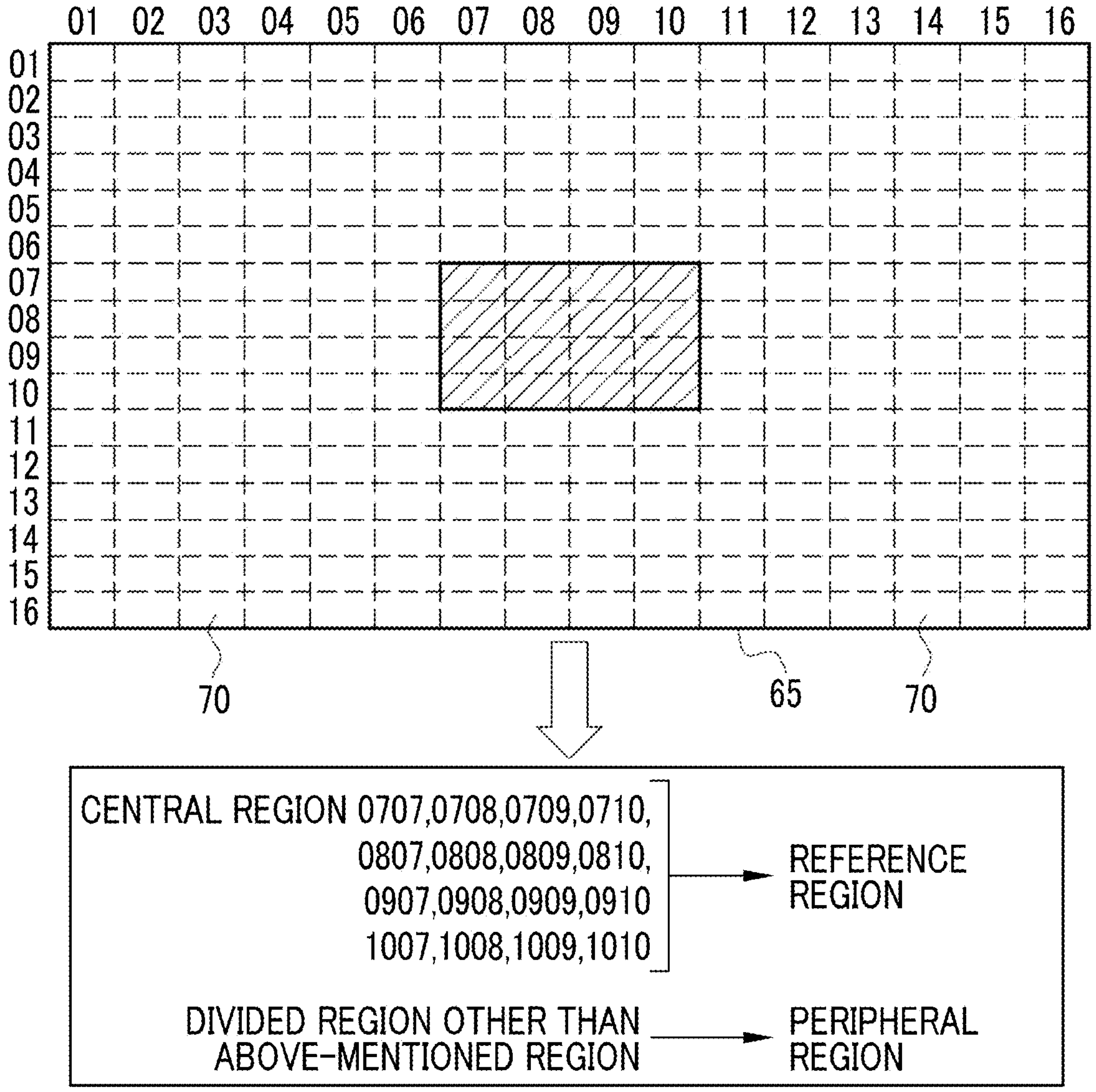
FIG. 10 is a diagram showing a reference region and a peripheral region.

As shown in FIG. 10, the reference regions are the central region of the image 65. There is a high probability that a subject, which is conventionally paid interest, is captured in the central region. Therefore, in a case where the central region is set as the reference regions, it is possible to perform more appropriate back light correction.

The surveillance camera 11 is particularly required to have stability in image quality of the image 65 shown on the monitor 13 for an application of clearly displaying an accident, a crime, or the like to provide an alarm notification to the user U. Thus, in the present example in which the surveillance camera 11 is used as the imaging apparatus, it is possible to highly exhibit the effect of being able to perform appropriate back light correction.

The imaging apparatus according to the technique of the present disclosure is not limited to the surveillance camera 11 described as an example. A single-lens reflex digital camera, a compact digital camera, a smartphone, or a tablet terminal may be used.

Modification Example 1

Figure 16:
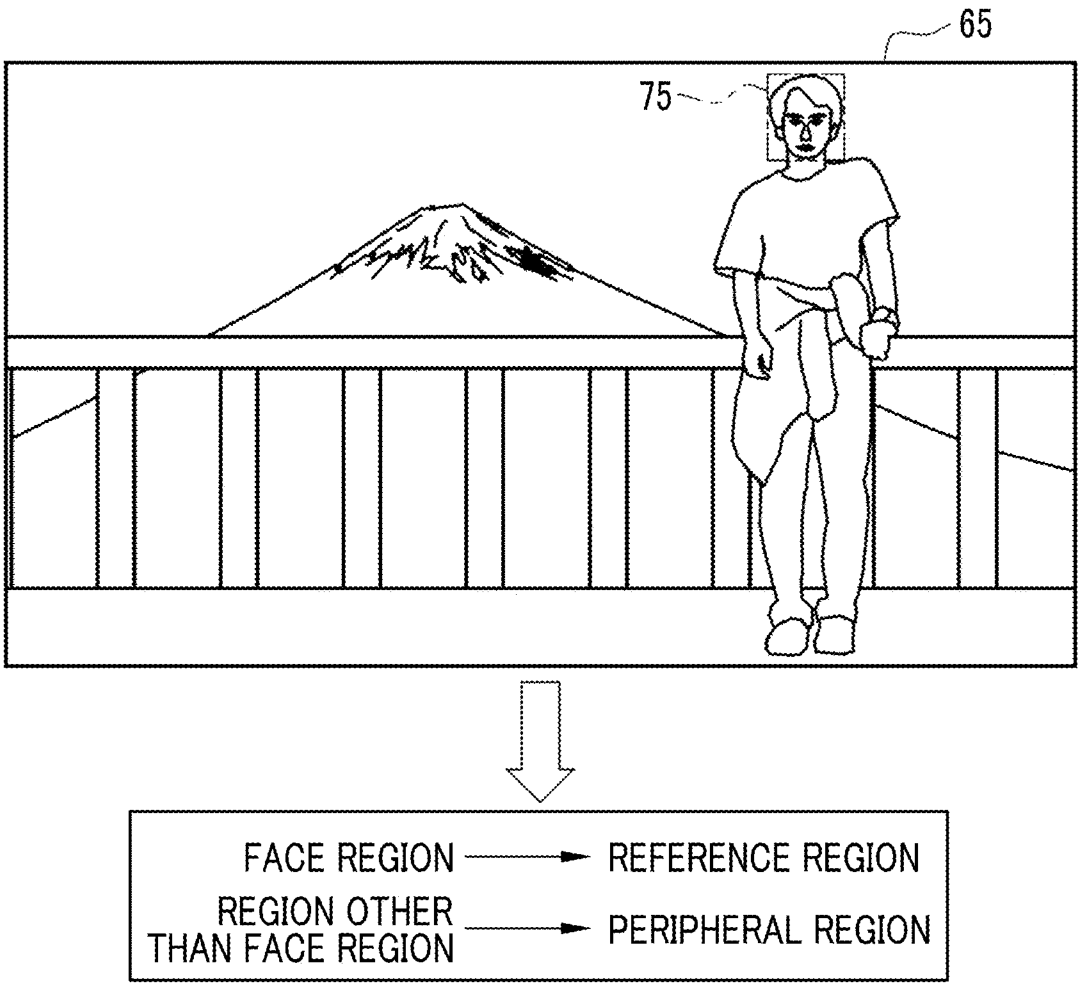
FIG. 16 is a diagram showing an example in which a face region is set as the reference region.

The reference region is not limited to the central region of the image 65 which is shown in the example. As shown in FIG. 16 as an example, a face region 75 of a person detected by a known face detection function may be used as the reference region. In such a case, a region other than the face region 75 is the peripheral region. The face region 75 is an example of the "region where the subject is detected" according to the technique of the present disclosure. It should be noted that the region where the subject is detected may be a region of a body of a person, a region of a face or a body of an animal, or a region of a head or a body of a vehicle such as an automobile, a train, or an airplane.

Modification Example 2

Figure 17:
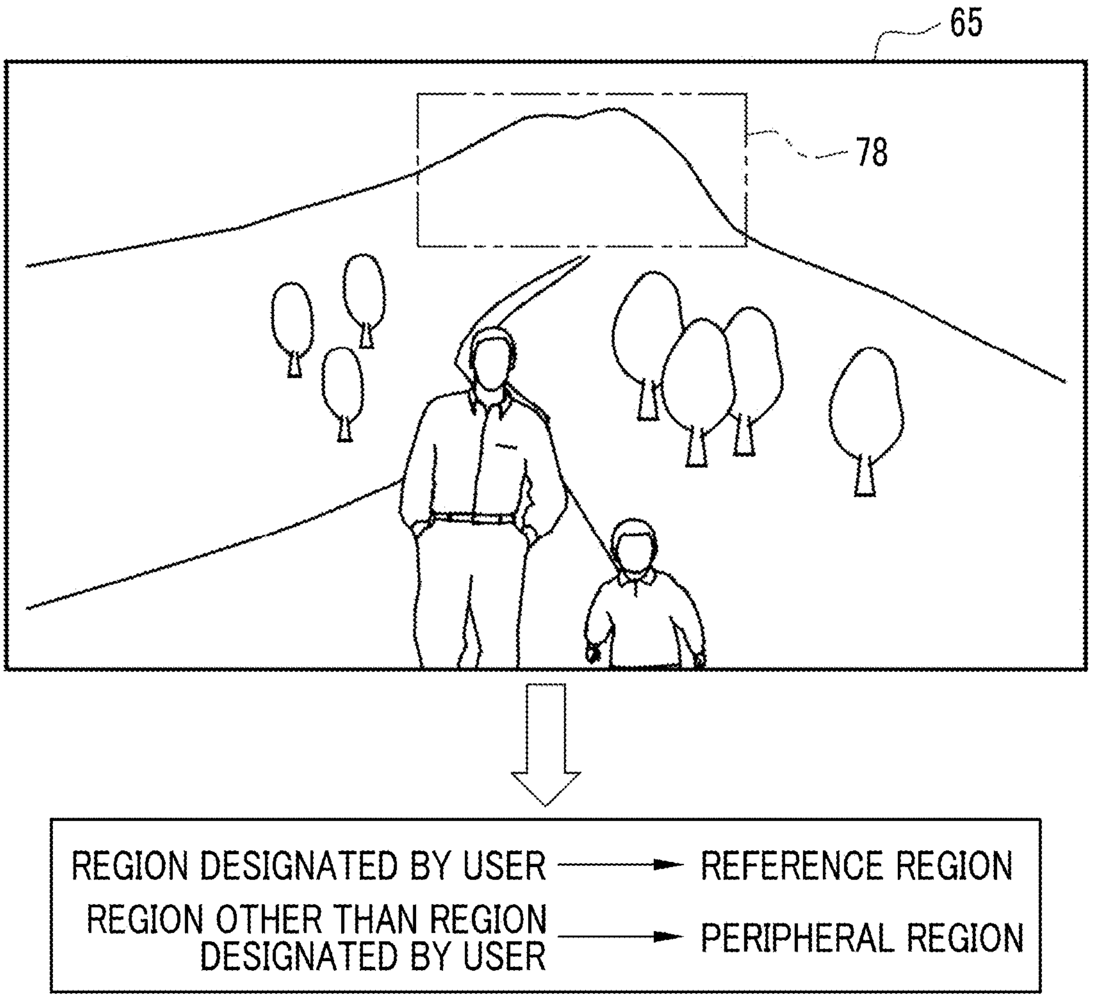
FIG. 17 is a diagram showing an example in which a region designated by a user is set as the reference region.

Further, as shown in FIG. 17 as an example, a region (hereinafter, referred to as a designated region) 78, which is designated by the user U, may be used as the reference region. In such a case, a region other than the designated region 78 is the peripheral region. It should be noted that the designated region 78 is, for example, a region in which automatic focus adjustment is performed on the basis of the image signals of the designated region 78.

The second determination may be performed only in a case where the backlit scene is determined by the first determination.

The administration device 12 may have a function of the back light correcting device.

In the embodiment, for example, it is possible to use the following various processors, as hardware structures of processing units performing various types of processing, such as the image processing section 35, the image delivery controller 38, the instruction receiving section 39, the image acquisition section 55, the exposure value calculation section 56, the first determination section 57, the second determination section 58, and the exposure controller 59. The various processors include, for example, the CPU 46 which is a general-purpose processor executing software (the operation program 50) to function as various processing sections, a programmable logic device (PLD), such as a field programmable gate array (FPGA), which is a processor of which the circuit configuration can be changed after manufacture, and/or a dedicated electric circuit, such as an application specific integrated circuit (ASIC), which is a processor having a dedicated circuit configuration designed to execute a specific process.

One processing section may be formed of one of these various processors, or may be formed of a combination of two or more processors of the same type or different types (for example, a combination of a plurality of FPGAs and/or a combination of a CPU and an FPGA). Further, the plurality of processing sections may be composed of one processor.

Examples of the plurality of processing sections composed of one processor include, first, as represented by a computer such as a client and a server, a form in which one processor is composed of a combination of one or more CPUs and software, and the processor functions as the plurality of processing sections. A second example of the configuration is an aspect in which a processor that implements the functions of the whole system including a plurality of processing sections using one integrated circuit (IC) chip is used. A representative example of this aspect is a system-on-chip (SoC). As described above, the various processing sections are configured using one or more of the various processors as a hardware structure.

More specifically, a circuitry combining circuit elements such as semiconductor elements may be used as the hardware structure of the various processors.

It is possible to understand the techniques described in the following supplementary notes from the above description.

Supplementary Note 1

A back light correcting device including a processor,
in which the processor is configured to:
- perform first determination to determine that an imaged scene of an image is a backlit scene, in which light is emitted from behind a subject, in a case where a difference in luminance between a reference region serving as a reference for back light correction in the image and a peripheral region of the reference region is equal to or greater than a first threshold value which is set in advance;
- perform the back light correction by performing exposure correction in a direction in which a luminance of the entire image increases in a case where it is determined by the first determination that the imaged scene is the backlit scene;
- perform second determination to determine whether or not a saturated region is present in the image; and
- set the first threshold value to a value lower than a value, which is obtained in a case where it is determined that the saturated region is not present, in a case where it is determined by the first determination that the imaged scene is the backlit scene and it is determined by the second determination that the saturated region is present.

Supplementary Note 2

The back light correcting device according to Supplementary Note 1,
in which the processor is configured to:
- set the peripheral region as a target of the second determination.

Supplementary Note 3

The back light correcting device according to Supplementary Note 2,
in which the processor is configured to:
- perform the second determination on the basis of a result of comparison between a second threshold value, which is set in advance, and a difference in luminance between the entire image and the peripheral region among a plurality of divided regions obtained by dividing the image.

Supplementary Note 4

The back light correcting device according to Supplementary Note 3,
in which the processor is configured to:
- determine that the saturated region is present in a case where a specified number or more of the peripheral regions, in which the difference in luminance between the entire image and the peripheral region is equal to or greater than the second threshold value, are present.

Supplementary Note 5

The back light correcting device according to any one of Supplementary Notes 1 to 4, in which the reference region is any one of a central region of the image, a region in which the subject is detected, or a region which is designated by a user.

Supplementary Note 6

An imaging apparatus including the back light correcting device according to any one of Supplementary Notes 1 to 5.

Supplementary Note 7

The imaging apparatus according to Supplementary Note 6, in which the imaging apparatus is a surveillance camera.

Various embodiments and/or various modification examples described above can also be appropriately combined in the technique of the present disclosure. Further, the technique of the present disclosure is not limited to the above-mentioned embodiments and various configurations can also be employed without departing from the gist thereof, of course. Furthermore, the technique of the present disclosure extends to a storage medium that non-temporarily stores a program, in addition to the program.

The description contents and shown contents having been described above are the detailed description of parts according to the technique of the present disclosure, and are merely an example of the technique of the present disclosure. For example, description relating to the above configurations, functions, actions, and effects is description relating to an example of configurations, functions, actions, and effects of the parts according to the embodiment of the technique of the present disclosure. Therefore, unnecessary parts may be deleted or new elements may be added or replaced in the above descriptions and illustrations without departing from the gist of the technique of the present disclosure. Further, the description of common technical knowledge and the like, which allow the technique of the present disclosure to be embodied and do not need to be particularly described, is omitted in the description contents and shown contents, which have been described above, to avoid complication and to facilitate the understanding of parts according to the technique of the present disclosure.

In the present specification, "A and/or B" is synonymous with "at least one of A or B". That is, the term "A and/or B" means only A, only B, or a combination of A and B. Further, in the present specification, the same meaning as "A and/or B" is applied even in a case where three or more items are expressed to be connected using "and/or".

All documents, patent applications, and technical standards described in the present specification are incorporated in the present specification by reference to the same extent as in a case where each of the documents, patent applications, technical standards are specifically and individually indicated to be incorporated by reference.

What is claimed is:

1. A back light correcting device comprising a processor, wherein the processor is configured to:

perform first determination to determine that an imaged scene of an image is a backlit scene, in which light is emitted from behind a subject, in a case where a difference in luminance between a reference region serving as a reference for back light correction in the image and a peripheral region of the reference region is equal to or greater than a first threshold value which is set in advance;

perform the back light correction by performing exposure correction in a direction in which a luminance of the entire image increases in a case where it is determined by the first determination that the imaged scene is the backlit scene;

perform second determination to determine whether or not a saturated region is present in the image; and set the first threshold value to a value lower than a value, which is obtained in a case where it is determined that the saturated region is not present, in a case where it is determined by the first determination that the imaged scene is the backlit scene and it is determined by the second determination that the saturated region is present.

2. The back light correcting device according to claim 1, wherein the processor is configured to:

set the peripheral region as a target of the second determination.

3. The back light correcting device according to claim 2, wherein the processor is configured to:

perform the second determination on the basis of a result of comparison between a second threshold value, which is set in advance, and a difference in luminance between the entire image and each peripheral region among a plurality of peripheral regions obtained by dividing the image.

4. The back light correcting device according to claim 3, wherein the processor is configured to:

determine that the saturated region is present in a case where a specified number or more of the peripheral regions, in which the differences in luminance between the entire image and the peripheral regions are equal to or greater than the second threshold value, are present.

5. The back light correcting device according to claim 1, wherein the reference region is any one of a central region of the image, a region in which the subject is detected, or a region which is designated by a user.

6. An imaging apparatus comprising:

the back light correcting device according to claim 1.

7. The imaging apparatus according to claim 6, wherein the imaging apparatus is a surveillance camera.

8. A method of operating a back light correcting device, the method comprising:

performing first determination to determine that an imaged scene of an image is a backlit scene, in which light is emitted from behind a subject, wherein a difference in luminance between a reference region serving as a reference for back light correction in the image and a peripheral region of the reference region is equal to or greater than a threshold value which is set in advance;

performing the back light correction by performing exposure correction in a direction in which a luminance of the entire image increases, wherein it is determined by the first determination that the imaged scene is the backlit scene;

performing second determination to determine whether or not a saturated region is present in the image; and setting the threshold value to a value lower than a value, which is obtained when the saturated region is not previously present, wherein it is determined by the first determination that the imaged scene is the backlit scene and it is determined by the second determination that the saturated region is present.

9. A non-transitory computer-readable storage medium storing a program of operating a back light correcting device, the program causing a computer to execute processing comprising:

performing first determination to determine that an imaged scene of an image is a backlit scene, in which light is emitted from behind a subject, in a case where a difference in luminance between a reference region serving as a reference for back light correction in the image and a peripheral region of the reference region is equal to or greater than a threshold value which is set in advance;

performing the back light correction by performing exposure correction in a direction in which a luminance of the entire image increases in a case where it is determined by the first determination that the imaged scene is the backlit scene;

performing second determination to determine whether or not a saturated region is present in the image; and setting the threshold value to a value lower than a value, which is obtained in a case where it is determined that the saturated region is not present, in a case where it is determined by the first determination that the imaged scene is the backlit scene and it is determined by the second determination that the saturated region is present.

* * * * *